United States Patent
Matsuda et al.

(10) Patent No.: US 11,411,523 B2
(45) Date of Patent: Aug. 9, 2022

(54) MOTOR DRIVE APPARATUS INCLUDING SMOOTHING CAPACITOR UNIT AND SNUBBER CAPACITOR

(71) Applicant: Fanuc Corporation, Yamanashi (JP)

(72) Inventors: Ryou Matsuda, Yamanashi (JP); Taku Sasaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 17/029,499

(22) Filed: Sep. 23, 2020

(65) Prior Publication Data

US 2021/0111660 A1 Apr. 15, 2021

(30) Foreign Application Priority Data

Oct. 15, 2019 (JP) .............................. JP2019-188835

(51) Int. Cl.
| | |
|---|---|
| *H02M 7/06* | (2006.01) |
| *H02P 29/024* | (2016.01) |
| *H02M 1/14* | (2006.01) |
| *H02P 27/06* | (2006.01) |

(52) U.S. Cl.
CPC ........ *H02P 29/0241* (2016.02); *H02M 1/143* (2013.01); *H02P 27/06* (2013.01)

(58) Field of Classification Search
CPC .... H02P 29/0241; H02P 27/06; H02M 1/143; H02M 1/0048; H02M 1/327; H02M 1/348

See application file for complete search history.

(56) References Cited

U.S. PATENT DOCUMENTS

| | | | |
|---|---|---|---|
| 6,115,270 A * | 9/2000 | Yamane | H02M 1/14 363/40 |
| 6,181,590 B1 * | 1/2001 | Yamane | H01L 25/162 257/E25.03 |
| 6,215,679 B1 * | 4/2001 | Yamane | H02M 7/003 257/E25.029 |
| 2007/0002594 A1 * | 1/2007 | Otsuka | H05K 7/1432 363/37 |

(Continued)

FOREIGN PATENT DOCUMENTS

| | | |
|---|---|---|
| JP | 4675379 B2 | 4/2011 |
| JP | 2011091250 A | 5/2011 |
| JP | 2018042384 A | 3/2018 |

*Primary Examiner* — Muhammad S Islam
(74) *Attorney, Agent, or Firm* — RatnerPrestia

(57) ABSTRACT

A motor drive apparatus includes a smoothing capacitor unit including at least one smoothing capacitor provided between a converter circuit and an inverter circuit in a power conversion circuit that generates motor drive power, a snubber capacitor for suppressing a surge voltage of a power device forming a part of the power conversion circuit, and a support plate on which the smoothing capacitor unit is mounted, wherein an electrode terminal of the smoothing capacitor unit and an electrode terminal of the snubber capacitor are placed in proximity to each other with the support plate being sandwiched between them, and a positive electrode terminal of the smoothing capacitor unit and a positive electrode terminal of the snubber capacitor are electrically connected to each other, and a negative electrode terminal of the smoothing capacitor unit and a negative electrode terminal of the snubber capacitor are electrically connected to each other.

9 Claims, 13 Drawing Sheets

(56) References Cited

U.S. PATENT DOCUMENTS

| | | | |
|---|---|---|---|
| 2010/0085780 A1* | 4/2010 | Nakai | H02M 3/33523 |
| | | | 363/21.16 |
| 2010/0132193 A1* | 6/2010 | Yoshinaga | H01G 4/232 |
| | | | 29/874 |
| 2012/0075889 A1* | 3/2012 | Sasaki | H02M 1/4225 |
| | | | 363/21.09 |
| 2012/0147641 A1* | 6/2012 | Yamaguchi | H02M 1/34 |
| | | | 363/132 |
| 2012/0163052 A1* | 6/2012 | Yonezawa | H02M 1/4225 |
| | | | 363/126 |

\* cited by examiner

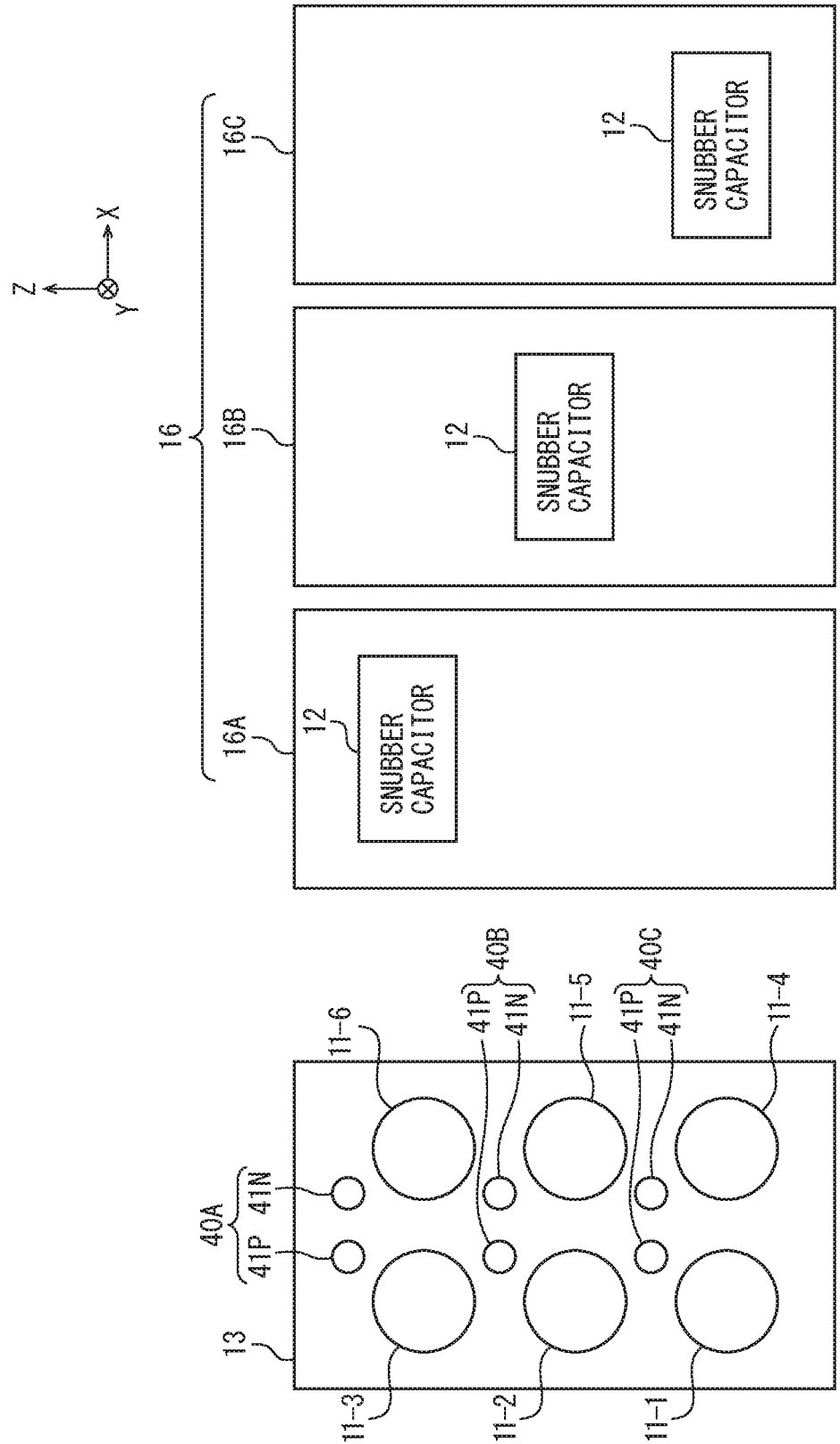

US 11,411,523 B2

MOTOR DRIVE APPARATUS INCLUDING SMOOTHING CAPACITOR UNIT AND SNUBBER CAPACITOR

CROSS-REFERENCE TO RELATED APPLICATIONS

This application is a new U.S. Patent Application that claims benefit of Japanese Patent Application No. 2019-188835, filed Oct. 15, 2019, the disclosure of which is incorporated herein by reference in its entirety for all purposes.

BACKGROUND OF THE INVENTION

1. Field of the Invention

The present invention relates to a motor drive apparatus including a smoothing capacitor unit and a snubber capacitor.

2. Description of the Related Art

In a motor drive apparatus that controls driving of motors in a machine tool, forging machinery, an injection molding machine, industrial machinery, or various robots, alternating-current power supplied from an alternating-current power supply is converted into direct-current power and output to a DC link by a converter circuit (rectifying circuit), the direct-current power in the DC link is further converted into alternating-current power by an inverter circuit, and the alternating-current power is supplied to the motor provided for each drive axis as drive power.

The "DC link" means a circuit portion that electrically connects the direct-current output side of the converter circuit and the direct-current input side of the inverter circuit to each other, and is sometimes called other names such as a "DC link portion," a "direct-current link," a "direct-current link portion," a "direct-current bus bar," or a "direct-current intermediate circuit." The DC link is equipped with a high-capacitance smoothing capacitor that suppresses pulsation of the direct-current output of the converter circuit and smooths a voltage input to the inverter circuit. The smoothing capacitor is also called a DC link capacitor.

A power conversion circuit including an inverter circuit and a PWM control converter circuit is embodied as, e.g., a bridge circuit including semiconductor switching devices called power devices and diodes connected in antiparallel with the semiconductor switching devices, and converts power by ON/OFF driving of the power devices. The power conversion circuit including the power devices is equipped with a snubber capacitor exhibiting good frequency characteristics to suppress surge voltages applied to the power devices.

As disclosed in, e.g., Japanese Unexamined Patent Publication No. 2018-042384, in an inverter structure including two inverter drive units that respectively convert direct-current powers into alternating-current powers used to drive two motors, and are accommodated in one housing, the two inverter drive units are known to include two switching circuit devices that are connected to a plurality of switching devices, and respectively convert direct-current powers into alternating-current powers and supply the alternating-current powers to the respective motors, a capacitor component including a snubber capacitor that smooths powers input to the switching circuit devices, and two pairs of bus bars that are connected to the snubber capacitor and respectively supply powers to the two switching circuit devices, and connection conductors that supply powers to the two switching circuit devices via the two pairs of bus bars, wherein the connection conductors are interposed between the two switching circuit devices in the one housing.

As disclosed in, e.g., Japanese Patent No. 4675379, a drive circuit for a motor that drives the motor using a converter circuit and an inverter circuit is known to include a printed circuit board for a control circuit, and a lead frame molded board that is mounted on a component surface of the printed circuit board at a predetermined distance by a projection made of a spacer molding resin and has a metal plate lead integrally molded with the molding resin, wherein the lead frame molded board is mounted with an electronic component forming the converter circuit and the inverter circuit with a projection for height adjustment, which is used to adjust a height of the electronic component and integrated with the molding resin, being sandwiched between the electronic component and the lead frame molded board, the lead frame molded board is further mounted with a snubber capacitor and a shunt resistor for the inverter circuit, the component surface of the printed circuit board is mounted with an electrolytic capacitor for the converter circuit, a power terminal of the electronic component is temporarily connected to the lead frame molded board, the metal plate lead of the lead frame molded board is then connected to the printed circuit board, and a control wiring terminal of the electronic component is connected to the printed circuit board.

As disclosed in, e.g., Japanese Unexamined Patent Publication No. 2011-091250, a capacitor is known to include an accommodation case including an opening, a plurality of capacitor devices that are accommodated in the accommodation case and have a pair of electrode surfaces at ends of the accommodation case on an opening side and a bottom surface side, an opening-side bus bar disposed on the electrode surface of the capacitor devices on the opening side, and a bottom surface-side bus bar disposed on the electrode surface of the capacitor devices on the bottom surface side, wherein the plurality of capacitor devices are connected in parallel with each other by the opening-side bus bar and the bottom surface-side bus bar, and the opening-side bus bar and the bottom surface-side bus bar respectively include connection terminals for external device connection disposed without being in proximity to a side surface of the capacitor devices.

SUMMARY OF INVENTION

As described above, the motor drive apparatus is equipped with a smoothing capacitor and a snubber capacitor. As the smoothing capacitor, a high-capacitance electrolytic capacitor is often used. Since the electrolytic capacitor may increase in its internal pressure as its internal electrolyte evaporates and turns into a gas upon excess voltage application, an opening for allowing the gas to escape is formed near a terminal. To prevent the electrolyte from leaking out of the opening, the electrolytic capacitor is subject to a constraint that it may be preferably placed so that the terminal does not face vertically. Especially an electrolytic capacitor including a screw terminal is subject to a strict constraint in terms of placement position because a bus bar and the screw terminal are screwed together. For this reason, depending on the arrangement of a power device, the physical distance between the smoothing capacitor and the snubber capacitor may be set large. Setting the distance between the smoothing capacitor and the snubber capacitor larger increases the magnitude of an inductance component between the smoothing capacitor and the snubber capacitor. Due to the presence of the inductance component, a potential difference occurs between the smoothing capacitor and the snubber capacitor, and this results in a high ringing current and, in turn, results in high heat losses of the smoothing capacitor and the snubber capacitor. To reduce these heat losses, it is contemplated to, e.g., select high-capacitance capacitors for the smoothing capacitor and the snubber capacitor, or place heat radiators such as cooling fans in the vicinities of the smoothing capacitor and the snubber capacitor. The higher the heat capacity of a capacitor, however, the more the capacitor costs. In addition, the placement of heat radiators raises the cost of the motor drive apparatus, and involves complication and an increase in size of the structure of the motor drive apparatus. It is, therefore, desired to achieve a simply structured, compact, low-cost motor drive apparatus that can reduce the heat losses of a smoothing capacitor and a snubber capacitor.

According to one aspect of the present disclosure, a motor drive apparatus includes a smoothing capacitor unit including at least one smoothing capacitor that smooths a voltage between a converter circuit and an inverter circuit in a power conversion circuit that generates motor drive power based on alternating-current power supplied from an alternating-current power supply, a snubber capacitor for suppressing a surge voltage of a power device forming a part of the power conversion circuit, and a support plate on which the smoothing capacitor unit is mounted, wherein an electrode terminal of the smoothing capacitor unit and an electrode terminal of the snubber capacitor are placed in proximity to each other with the support plate being sandwiched between them, and a positive electrode terminal of the electrode terminal of the smoothing capacitor unit and a positive electrode terminal of the electrode terminal of the snubber capacitor are electrically connected to each other, and a negative electrode terminal of the electrode terminal of the smoothing capacitor unit and a negative electrode terminal of the electrode terminal of the snubber capacitor are electrically connected to each other.

BRIEF DESCRIPTION OF THE DRAWINGS

The present invention will be more clearly understood with reference to the following accompanying drawings:

FIG. 14 is a side view illustrating an exemplary modification of a connection portion in the motor drive apparatus according to the embodiment of the present disclosure.

DETAILED DESCRIPTION

A motor drive apparatus including a smoothing capacitor unit and a snubber capacitor will be described below with reference to the drawings. These drawings use different scales as appropriate to facilitate an understanding. The mode illustrated in each drawing is one example for carrying out the present disclosure, and the present disclosure is not limited to the embodiments illustrated in these drawings.

Figure 1A:
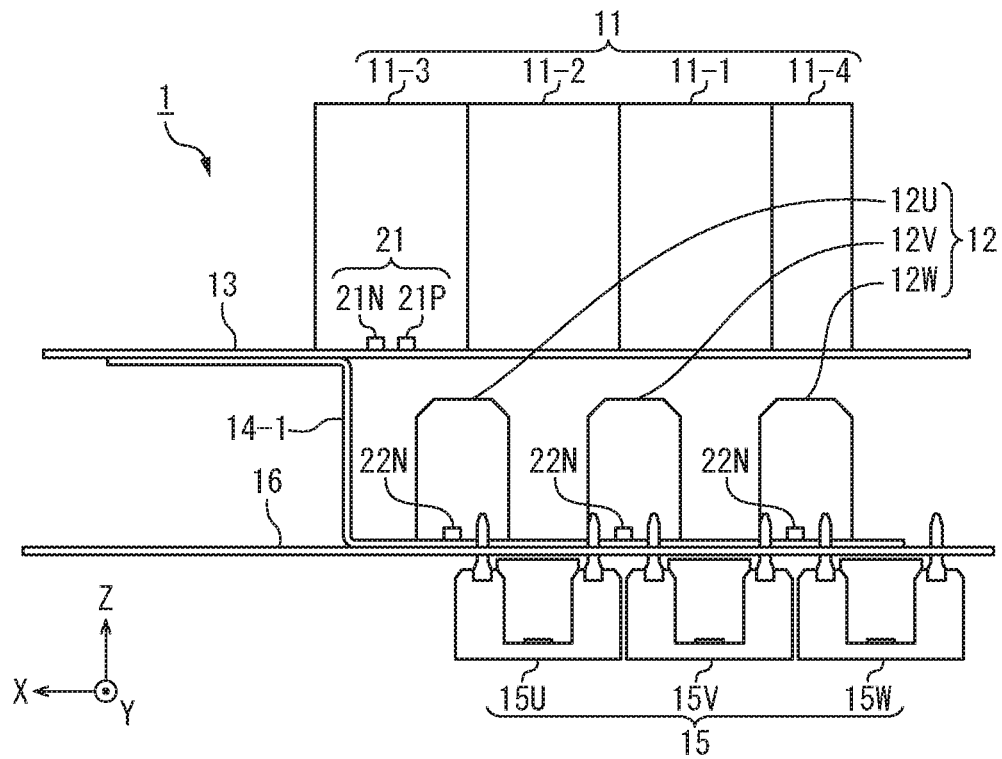
FIG. 1A is a side view illustrating the mounting structure of a smoothing capacitor unit, a snubber capacitor, and a power device in a motor drive apparatus according to one embodiment of the present disclosure.
Figure 1B:
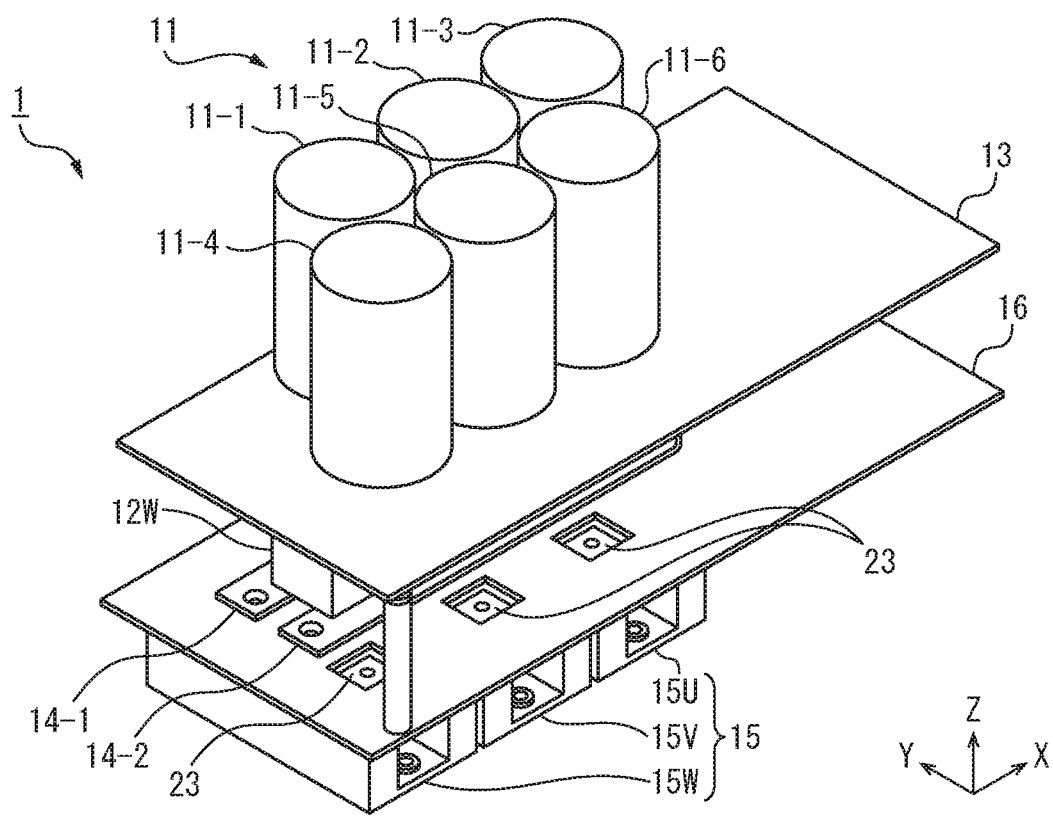
FIG. 1B is a perspective view illustrating the mounting structure of the smoothing capacitor unit, the snubber capacitor, and the power device in the motor drive apparatus according to the embodiment of the present disclosure.
Figure 2:
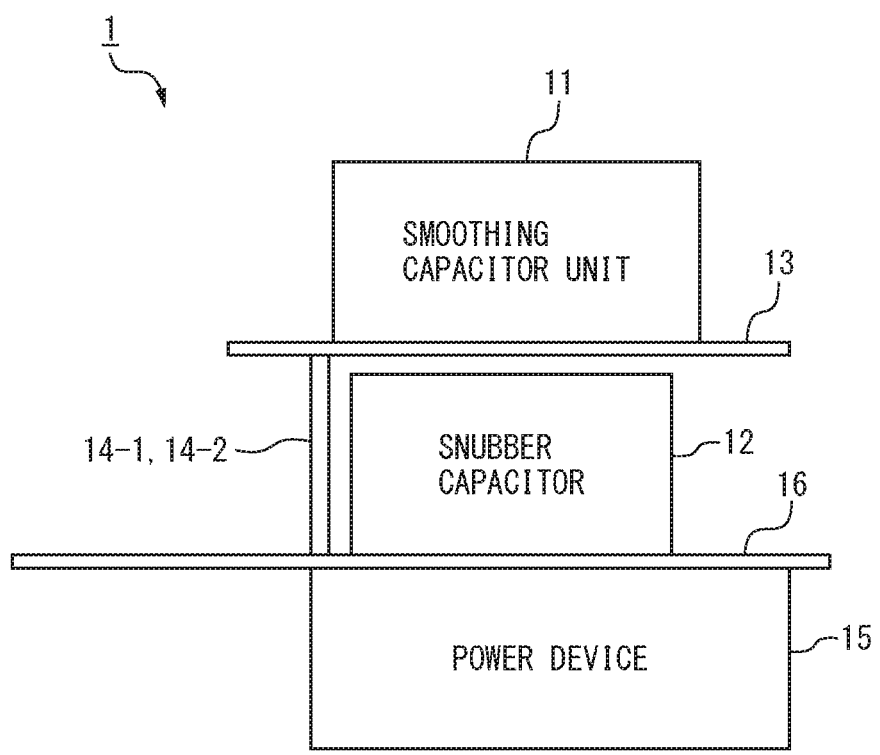
FIG. 2 is a side view schematically illustrating the mounting structure of the smoothing capacitor unit, the snubber capacitor, and the power device in the motor drive apparatus according to the embodiment of the present disclosure.
Figure 3A:
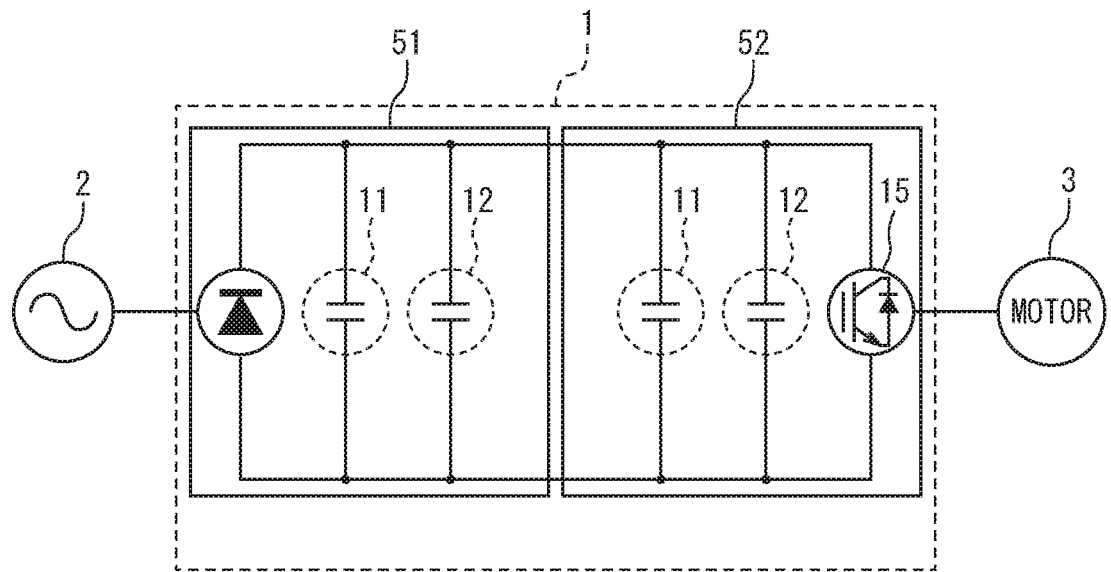
FIG. 3A is a view schematically illustrating a motor drive apparatus that generates motor drive power based on alternating-current power supplied from an alternating-current power supply, and depicts a circuit diagram of the motor drive apparatus.
Figure 3B:
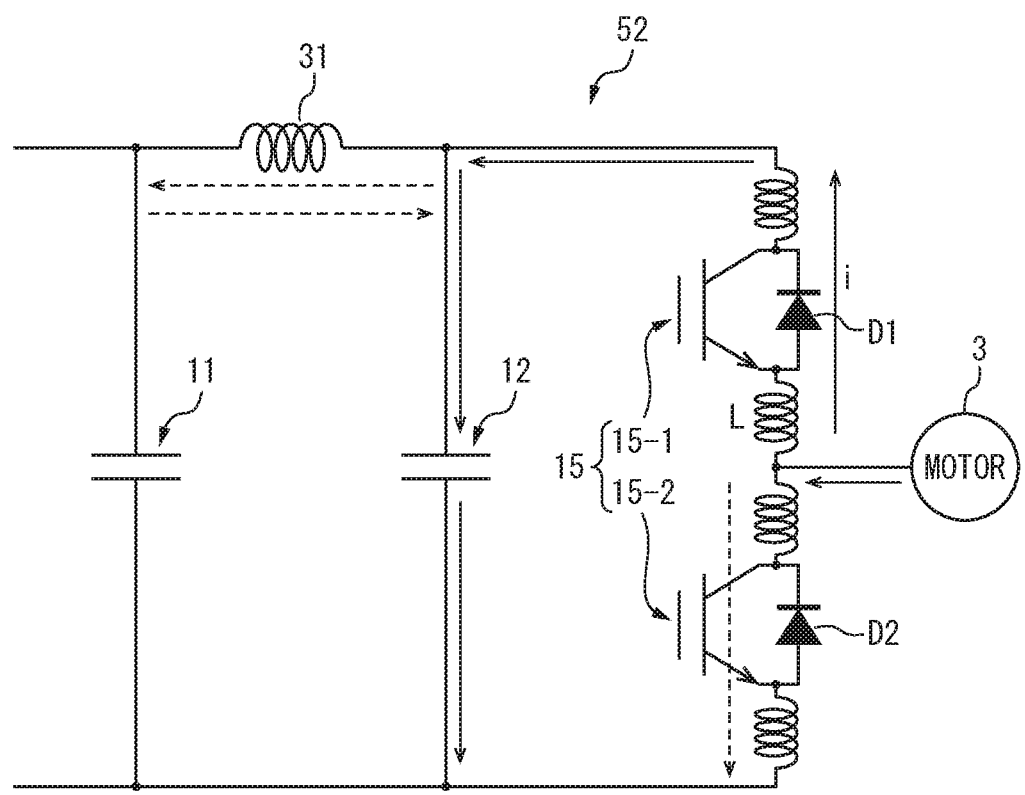
FIG. 3B is a view schematically illustrating the motor drive apparatus that generates the motor drive power based on the alternating-current power supplied from the alternating-current power supply, and depicts a circuit diagram for explaining generation of a ringing current.

FIG. 1A is a side view illustrating the mounting structure of a smoothing capacitor unit, a snubber capacitor, and a power device in a motor drive apparatus according to one embodiment of the present disclosure. FIG. 1B is a perspective view illustrating the mounting structure of the smoothing capacitor unit, the snubber capacitor, and the power device in the motor drive apparatus according to the embodiment of the present disclosure. The same reference numerals denote hereinafter components having the same functions in different drawings. FIG. 2 is a side view schematically illustrating the mounting structure of the smoothing capacitor unit, the snubber capacitor, and the power device in the motor drive apparatus according to the embodiment of the present disclosure. FIG. 3A is a view schematically illustrating a motor drive apparatus that generates motor drive power based on alternating-current power supplied from an alternating-current power supply, and depicts a circuit diagram of the motor drive apparatus. FIG. 3B is a view schematically illustrating the motor drive apparatus that generates the motor drive power based on the alternating-current power supplied from the alternating-current power supply, and depicts a circuit diagram for explaining generation of a ringing current. For the sake of descriptive simplicity, FIGS. 3A and 3B illustrate an alternating-current power supply 2 and a motor 3 assuming that they each have only one phase, but each of the alternating-current power supply 2 and the motor 3 may have a single- or three-phase configuration.

Before a description of a motor drive apparatus according to one embodiment of the present disclosure, the circuit of a motor drive apparatus that generates motor drive power based on alternating-current power supplied from an alternating-current power supply, and the generation principle of a ringing current will be described below with reference to FIGS. 3A and 3B.

As illustrated in FIGS. 3A and 3B, a motor drive apparatus 1 includes a converter circuit (rectifying circuit) 51 that converts alternating-current power supplied from the alternating-current power supply 2 into direct-current power and outputs the direct-current power to a DC link, and an inverter circuit 52 that converts the direct-current power in the DC link into alternating-current power and outputs the alternating-current power as motor drive power.

The inverter circuit 52 is embodied as a bridge circuit of a power device 15 that uses a semiconductor switching device and a diode connected in antiparallel with the power device 15. When the converter circuit 51 is implemented as a diode rectifying circuit, it includes no power device, but when the converter circuit 51 is implemented as a PWM control rectifying circuit, it is embodied as a bridge circuit of a power device and a diode connected in antiparallel with the power device, as in the inverter circuit 52. Examples of the power device may include a unipolar transistor such as an FET, a bipolar transistor, an IGBT, a thyristor, and a GTO. A combination of a semiconductor switching device and a diode may even be defined as a "power device," and such a power device is also called a "power module."

A DC link between the converter circuit 51 and the inverter circuit 52 is provided with a smoothing capacitor unit 11 that smooths the voltage in the DC link. In the example illustrated in FIG. 3A, smoothing capacitor units 11 and snubber capacitors 12 are provided on the direct-current output side of the diode in the converter circuit 51 and the direct-current input side of the power device 15 of the inverter circuit 52.

A closed circuit (loop circuit) is formed between the positive electrode terminals and the negative electrode terminals of the smoothing capacitor unit 11 and the snubber capacitor 12, and thus generates an inductance component. Referring to FIG. 3B, reference numeral 31 denotes the inductance component. In the inverter circuit 52, an upper power device 15-1 and a lower power device 15-2 are alternately turned on and off to convert the direct-current power in the DC link into alternating-current power. When, for example, the lower power device 15-2 is turned off, a current i returns via a diode D1 connected in antiparallel with the upper power device 15-1. At this time, a surge voltage L×di/dt is generated by, e.g., the internal inductance of the upper power device 15-1. The surge voltage L×di/dt causes a current to flow through the snubber capacitor 12, and thus raises the voltage across the positive electrode terminal and the negative electrode terminal of the snubber capacitor 12. As a result, due to the presence of the inductance component 31, a potential difference occurs between the smoothing capacitor unit 11 and the snubber capacitor 12, and this causes a ringing current. Since setting the distance between the smoothing capacitor unit 11 and the snubber capacitor 12 larger increases the magnitude of the inductance component between the smoothing capacitor unit 11 and the snubber capacitor 12, and thus causes a larger potential difference between the smoothing capacitor unit 11 and the snubber capacitor 12, a higher ringing current is generated between the smoothing capacitor unit 11 and the snubber capacitor 12, and this results in higher heat losses of the smoothing capacitor unit 11 and the snubber capacitor 12.

To reduce the heat losses of a smoothing capacitor and a snubber capacitor due to generation of a ringing current, a motor drive apparatus 1 according to one embodiment of the present disclosure includes a smoothing capacitor unit 11 including at least one smoothing capacitor that smooths the voltage between a converter circuit and an inverter circuit in a power conversion circuit that generates motor drive power based on alternating-current power supplied from an alternating-current power supply, a snubber capacitor 12 for suppressing a surge voltage of a power device 15 forming a part of the power conversion circuit, and a support plate 13 on which the smoothing capacitor unit 11 is mounted, as illustrated in FIGS. 1A, 1B, and 2.

The smoothing capacitor unit 11 may preferably include at least one smoothing capacitor. The smoothing capacitor is implemented as, e.g., an electrolytic capacitor or a film capacitor. When the smoothing capacitor unit 11 is formed by only one smoothing capacitor, the smoothing capacitor preferably has a high capacitance. When the smoothing capacitor unit 11 is formed by a plurality of smoothing capacitors, combining a plurality of low-capacitance smoothing capacitors makes it possible to achieve high-capacitance design of the smoothing capacitor unit 11. In the example illustrated in FIGS. 1A and 1B, the smoothing capacitor unit 11 includes six smoothing capacitors 11-1, 11-2, 11-3, 11-4, 11-5, and 11-6 as an example. The connection relationship between individual smoothing capacitors when the smoothing capacitor unit 11 is formed by a plurality of smoothing capacitors does not particularly limit this embodiment. In one example, the smoothing capacitor unit 11 is formed by, e.g., series connection of a set of parallel-connected capacitors 11-1, 11-2, and 11-3 and a set of parallel-connected capacitors 11-4, 11-5, and 11-6.

The smoothing capacitor unit 11 further includes an electrode terminal 21 formed by a positive electrode terminal 21P and a negative electrode terminal 21N. The shape and the position of the electrode terminal 21 formed by the positive electrode terminal 21P and the negative electrode terminal 21N illustrated in FIG. 1A are merely an example, and other shapes and positions are also applicable.

The smoothing capacitor unit 11 is mounted on the support plate 13. The support plate 13 may be implemented as a printed circuit board having various components and wiring mounted on it, or may be implemented as a molded plate having no various components and wiring mounted on it. Examples of the material forming the support plate 13 may include Bakelite, paper epoxy, glass epoxy, alumina, and a combination thereof.

When a motor (not illustrated) driven by the motor drive apparatus 1 is designed as a three-phase alternating-current motor, power devices 15U, 15V, and 15W are provided for the U, V, and W phases, respectively. The power devices 15U, 15V, and 15W are mounted on, e.g., a printed circuit board 16 in the example illustrated in FIGS. 1A and 1B. Alternatively, the power devices 15U, 15V, and 15W may be mounted on the surface of the support plate 13 opposite to its other surface on which the smoothing capacitor unit 11 is mounted. Reference numerals 23 denote the input/output terminals of the respective power devices 15U, 15V, and 15W. The shapes and the positions of the input/output terminals 23 of the respective power devices 15U, 15V, and 15W illustrated in FIG. 1B are merely an example, and other shapes and positions are also applicable.

The snubber capacitor 12 is implemented as, e.g., an electrolytic capacitor or a film capacitor. The snubber capacitor 12 is provided for each power device 15 and mounted on the printed circuit board 16. In the example illustrated in FIGS. 1A, 1B, and 2, since a three-phase alternating-current motor is used as the motor driven by the motor drive apparatus 1, snubber capacitors 12U, 12V, and 12W are provided in correspondence with the power devices 15U, 15V, and 15W. The snubber capacitor 12 includes an electrode terminal 22 formed by a positive electrode terminal 22P and a negative electrode terminal 22N.

The electrode terminal 21 of the smoothing capacitor unit 11 and the electrode terminal 22 of the snubber capacitor 12 are placed in as close proximity to each other as possible with the support plate 13 being sandwiched between them. More preferably, the electrode terminal 21 of the smoothing capacitor unit 11 and the electrode terminal 22 of the snubber capacitor 12 are placed on opposite sides of the support plate 13. When, however, each of the smoothing capacitors 11-1 to 11-6 constituting the smoothing capacitor unit 11 is implemented as an electrolytic capacitor, the smoothing capacitor unit 11 is placed so that an opening for preventing an increase in its internal pressure upon excess voltage application does not face vertically.

The positive electrode terminal 21P of the electrode terminal 21 of the smoothing capacitor unit 11 and the positive electrode terminal 22P of the electrode terminal 22 of the snubber capacitor 12 are electrically connected to each other via a first electrical conductor 14-1. The negative electrode terminal 21N of the electrode terminal 21 of the smoothing capacitor unit 11 and the negative electrode terminal 22N of the electrode terminal 22 of the snubber capacitor 12 are electrically connected to each other via a second electrical conductor 14-2.

The positive electrode terminal 21P and the negative electrode terminal 21N of the smoothing capacitor unit 11, and the positive electrode terminal 22P and the negative electrode terminal 22N of the snubber capacitor 12 are implemented as, e.g., screw terminals. In this case, by fastening with conductive screws, the first electrical conductor 14-1 and the positive electrode terminal 21P of the smoothing capacitor unit 11 are electrically connected to each other, and the first electrical conductor 14-1 and the positive electrode terminal 22P of the snubber capacitor 12 are electrically connected to each other. By fastening with conductive screws, the second electrical conductor 14-2 and the negative electrode terminal 21N of the smoothing capacitor unit 11 are electrically connected to each other, and the second electrical conductor 14-2 and the negative electrode terminal 22N of the snubber capacitor 12 are electrically connected to each other.

Alternatively, the positive electrode terminal 21P of the smoothing capacitor unit 11 and the positive electrode terminal 22P of the snubber capacitor 12 are electrically connected to the first electrical conductor 14-1 by soldering. The negative electrode terminal 21N of the smoothing capacitor unit 11 and the negative electrode terminal 22N of the snubber capacitor 12 are electrically connected to the second electrical conductor 14-2 by soldering.

Examples of each of the first electrical conductor 14-1 and the second electrical conductor 14-2 may include a bus bar, a conductive cable, and an insulating-coated conductive member having its outer peripheral surface coated with an insulating coating. Each of the bus bar and the conductive cable uses a conductor for conducting a high-capacity current, and is manufactured by sheeting a metal such as copper, brass, or aluminum. As for the insulating-coated conductive member as well, the conductive member portion uses a conductor for conducting a high-capacity current, and is manufactured by sheeting a metal such as copper, brass, or aluminum. Especially when each of the first electrical conductor 14-1 and the second electrical conductor 14-2 is implemented as an insulating-coated conductive member, the insulating coating peels off and the conductive member is exposed outside in the connection portion of the insulating-coated conductive member to the respective electrode terminals of the smoothing capacitor unit 11 and the snubber capacitor 12. The conductive cable and the insulating-coated conductive member may be highly rigid, or may be flexible. In this embodiment, each of the first electrical conductor 14-1 and the second electrical conductor 14-2 is implemented as a bus bar as an example.

As described above, according to this embodiment, the electrode terminal 21 of the smoothing capacitor unit 11 and the electrode terminal 22 of the snubber capacitor 12 are placed in as close proximity to each other as possible with the support plate 13 being sandwiched between them. Therefore, since the electrical path between the positive electrode terminal 21P of the smoothing capacitor unit 11 and the positive electrode terminal 22P of the electrode terminal 22 of the snubber capacitor 12, and the electrical path between the negative electrode terminal 21N of the smoothing capacitor unit 11 and the negative electrode terminal 22N of the electrode terminal 22 of the snubber capacitor 12 are short, the magnitude of the inductance component is low. This results in a low ringing current, and the heat losses of the smoothing capacitor unit 11 and the snubber capacitor 12 can thus be kept down. Since the heat losses of the smoothing capacitor unit 11 and the snubber capacitor 12 can be kept down, heat radiators may not be used or can be reduced in number, and cost saving, structure simplification, and downsizing of the motor drive apparatus can thus be achieved. When, for example, the heat radiators are implemented as cooling fans, since currents for operating the cooling fans may not be used or can be reduced, the power consumption of the motor drive apparatus can be cut.

Several modes of the smoothing capacitor unit 11 will be enumerated subsequently. Note, as an example, that the smoothing capacitor unit 11 is formed by a plurality of smoothing capacitors in first and second modes, and formed by only one smoothing capacitor in a third mode.

Figure 4A:
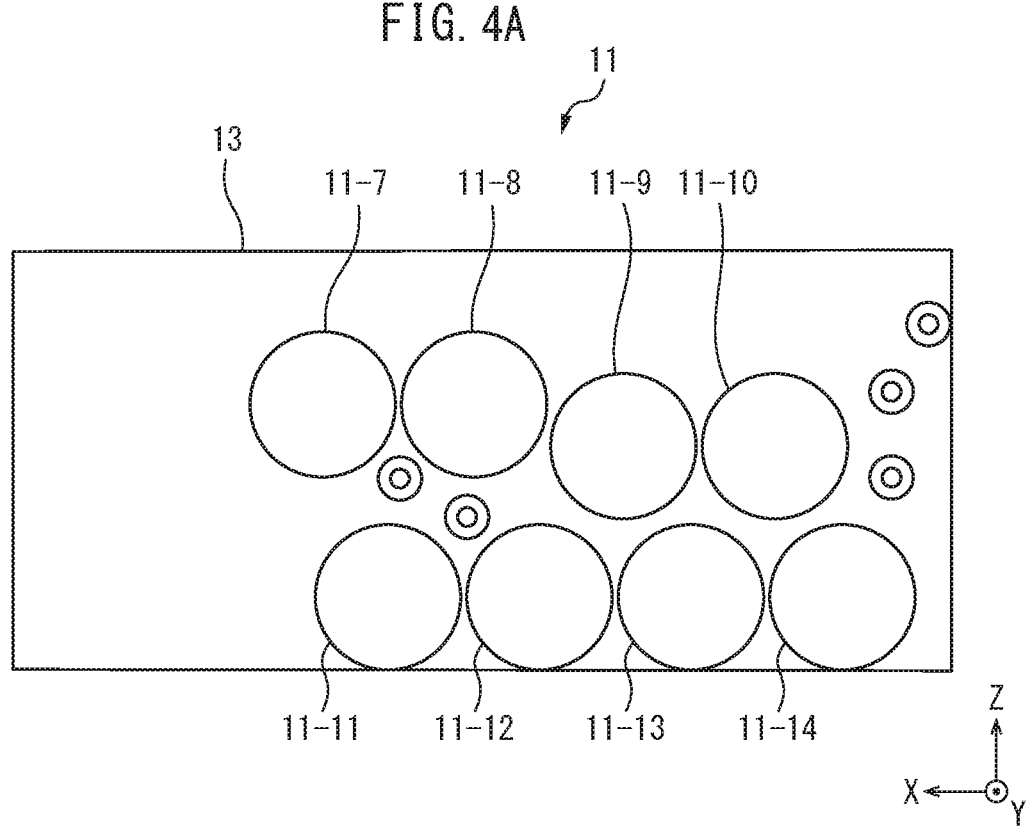
FIG. 4A is a top view illustrating an exemplary first mode of the smoothing capacitor unit in the motor drive apparatus according to the embodiment of the present disclosure.
Figure 4B:
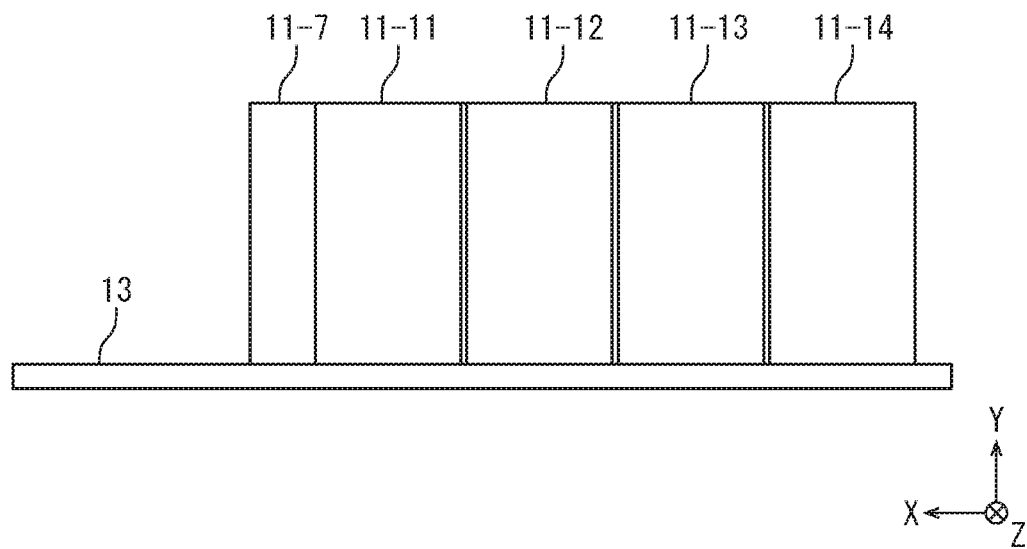
FIG. 4B is a side view illustrating the exemplary first mode of the smoothing capacitor unit in the motor drive apparatus according to the embodiment of the present disclosure.

FIG. 4A is a top view illustrating an exemplary first mode of the smoothing capacitor unit in the motor drive apparatus according to the embodiment of the present disclosure. FIG. 4B is a side view illustrating the exemplary first mode of the smoothing capacitor unit in the motor drive apparatus according to the embodiment of the present disclosure.

The smoothing capacitor unit 11 according to the first mode illustrated in FIGS. 4A and 4B is formed by a plurality of (in the example illustrated in FIGS. 4A and 4B, eight) smoothing capacitors 11-7 to 11-14 electrically connected to each other, and is mounted on the support plate 13, like the smoothing capacitor unit 11 illustrated in FIGS. 1A, 1B, and 2. The smoothing capacitors 11-7 to 11-14 are electrically connected to each other by soldering. Combining a plurality of low-capacitance smoothing capacitors 11-7 to 11-14 makes it possible to achieve high-capacitance design of the smoothing capacitor unit 11. The connection relationship between individual smoothing capacitors when the smoothing capacitor unit 11 is formed by a plurality of smoothing capacitors does not particularly limit this embodiment. In one example, the smoothing capacitor unit 11 is formed by, e.g., series connection of a set of parallel-connected capacitors 11-7 to 11-10 and a set of parallel-connected capacitors 11-11 to 11-14. As another example, the smoothing capacitor unit 11 is formed by series connection of the smoothing capacitors 11-7 to 11-14. As still another example, the smoothing capacitor unit 11 is formed by parallel connection of the smoothing capacitors 11-7 to 11-14.

Figure 5A:
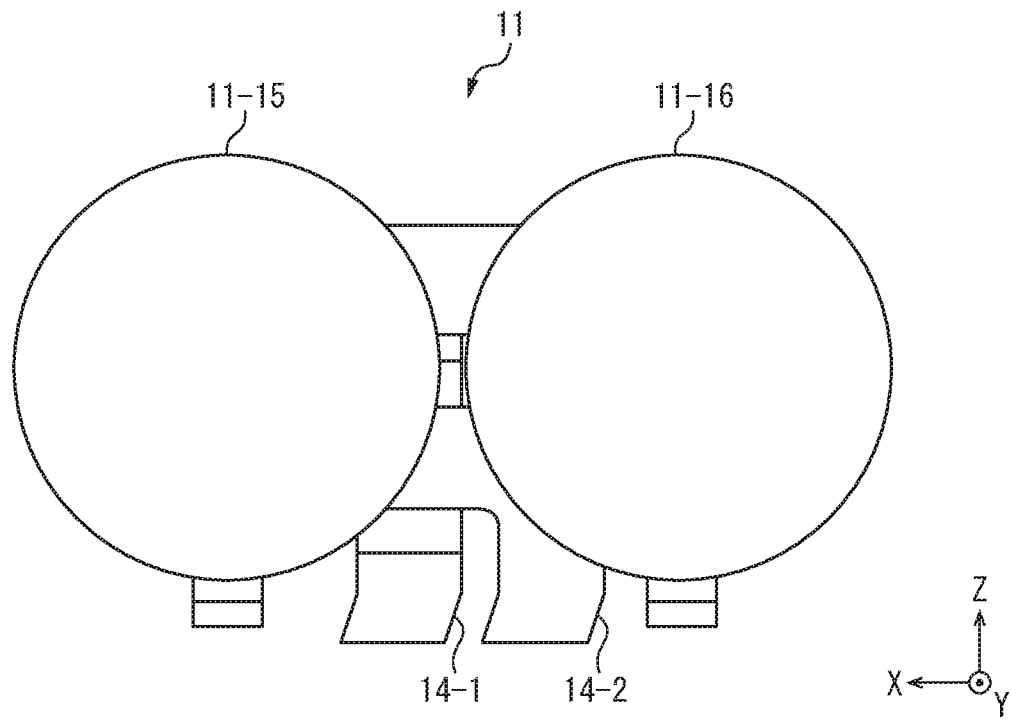
FIG. 5A is a top view illustrating an exemplary second mode of the smoothing capacitor unit in the motor drive apparatus according to the embodiment of the present disclosure.
Figure 5B:
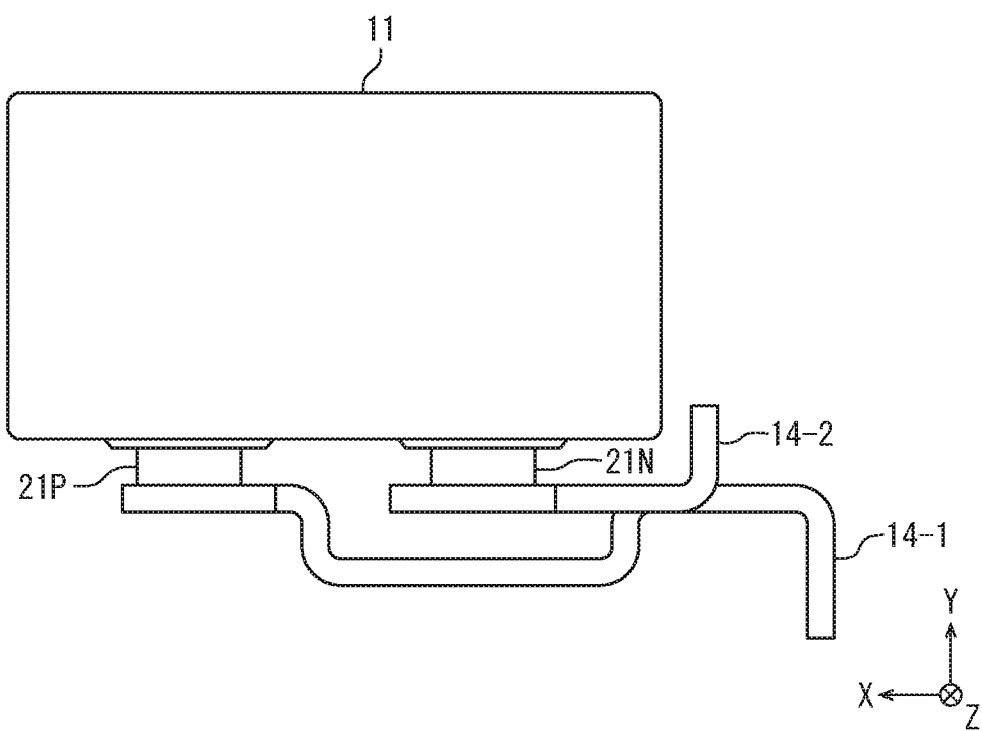
FIG. 5B is a side view illustrating the exemplary second mode of the smoothing capacitor unit in the motor drive apparatus according to the embodiment of the present disclosure.

FIG. 5A is a top view illustrating an exemplary second mode of the smoothing capacitor unit in the motor drive apparatus according to the embodiment of the present disclosure. FIG. 5B is a side view illustrating the exemplary second mode of the smoothing capacitor unit in the motor drive apparatus according to the embodiment of the present disclosure.

The smoothing capacitor unit 11 according to the second mode illustrated in FIGS. 5A and 5B is formed by a plurality of (in the example illustrated in FIGS. 5A and 5B, two) screw terminal smoothing capacitors 11-15 and 11-16 electrically connected to each other. Combining a plurality of low-capacitance smoothing capacitors 11-15 and 11-16 makes it possible to achieve high-capacitance design of the smoothing capacitor unit 11. As in the first mode, the connection relationship between individual smoothing capacitors when the smoothing capacitor unit 11 is formed by a plurality of smoothing capacitors does not particularly limit this embodiment. In one example, the smoothing capacitor unit 11 is formed by, e.g., series connection of the smoothing capacitors 11-15 and 11-16. As another example, the smoothing capacitor unit 11 is formed by parallel connection of the smoothing capacitors 11-15 and 11-16.

Figure 6A:
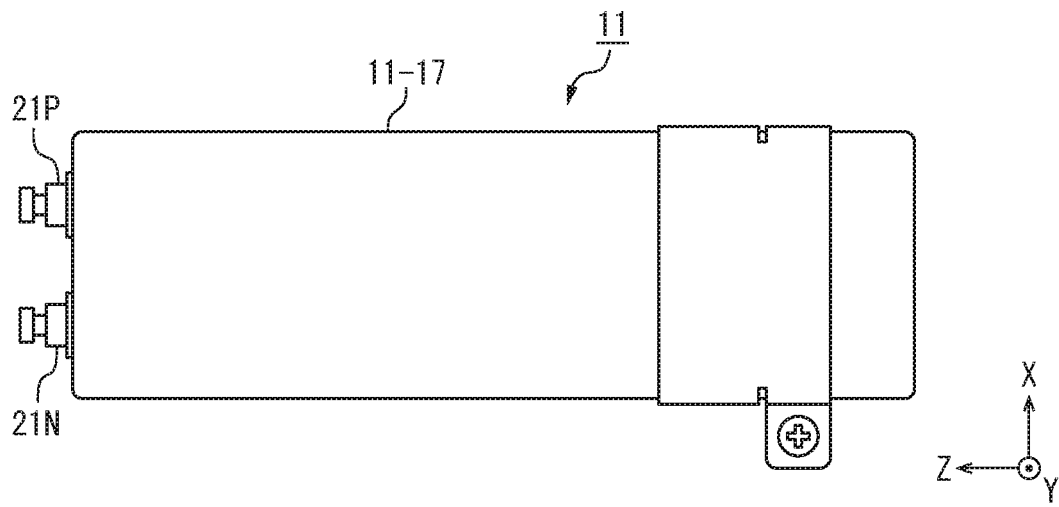
FIG. 6A is a side view illustrating an exemplary third mode of the smoothing capacitor unit in the motor drive apparatus according to the embodiment of the present disclosure.
Figure 6B:
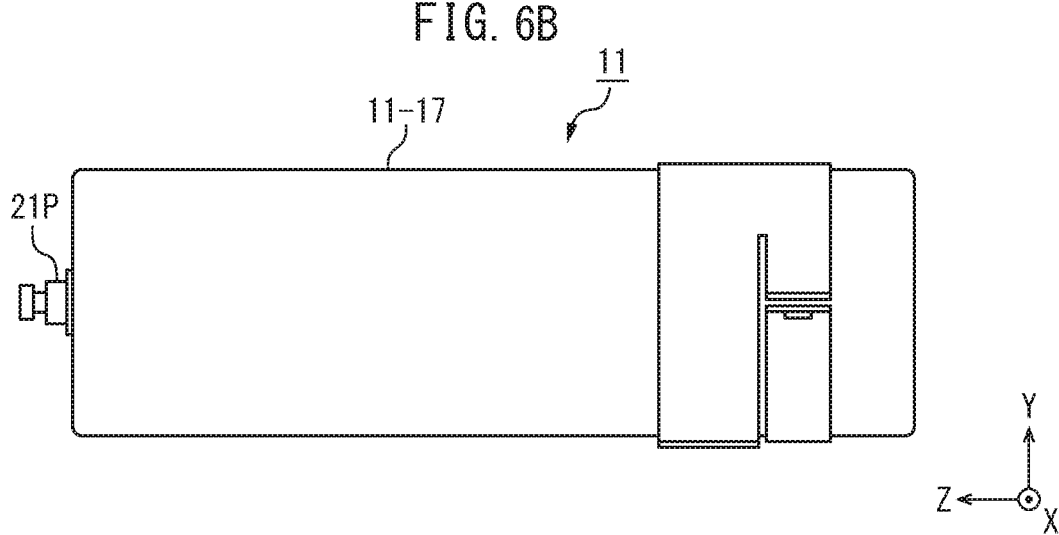
FIG. 6B is another side view illustrating the exemplary third mode of the smoothing capacitor unit in the motor drive apparatus according to the embodiment of the present disclosure.
Figure 6C:
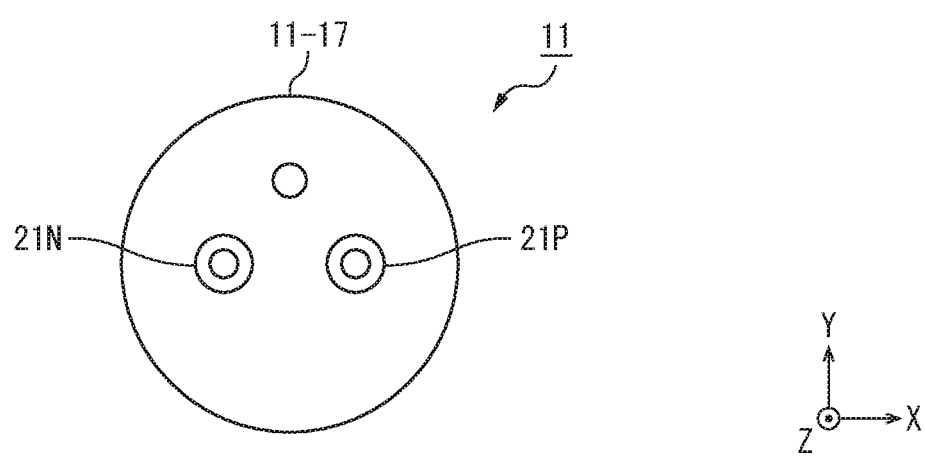
FIG. 6C is a top view illustrating the exemplary third mode of the smoothing capacitor unit in the motor drive apparatus according to the embodiment of the present disclosure.

FIG. 6A is a side view illustrating an exemplary third mode of the smoothing capacitor unit in the motor drive apparatus according to the embodiment of the present disclosure. FIG. 6B is another side view illustrating the exemplary third mode of the smoothing capacitor unit in the motor drive apparatus according to the embodiment of the present disclosure. FIG. 6C is a top view illustrating the exemplary third mode of the smoothing capacitor unit in the motor drive apparatus according to the embodiment of the present disclosure. When, for example, the voltage of the DC link is relatively low, the smoothing capacitor unit 11 may be formed by only one smoothing capacitor 11-17.

Figure 7:
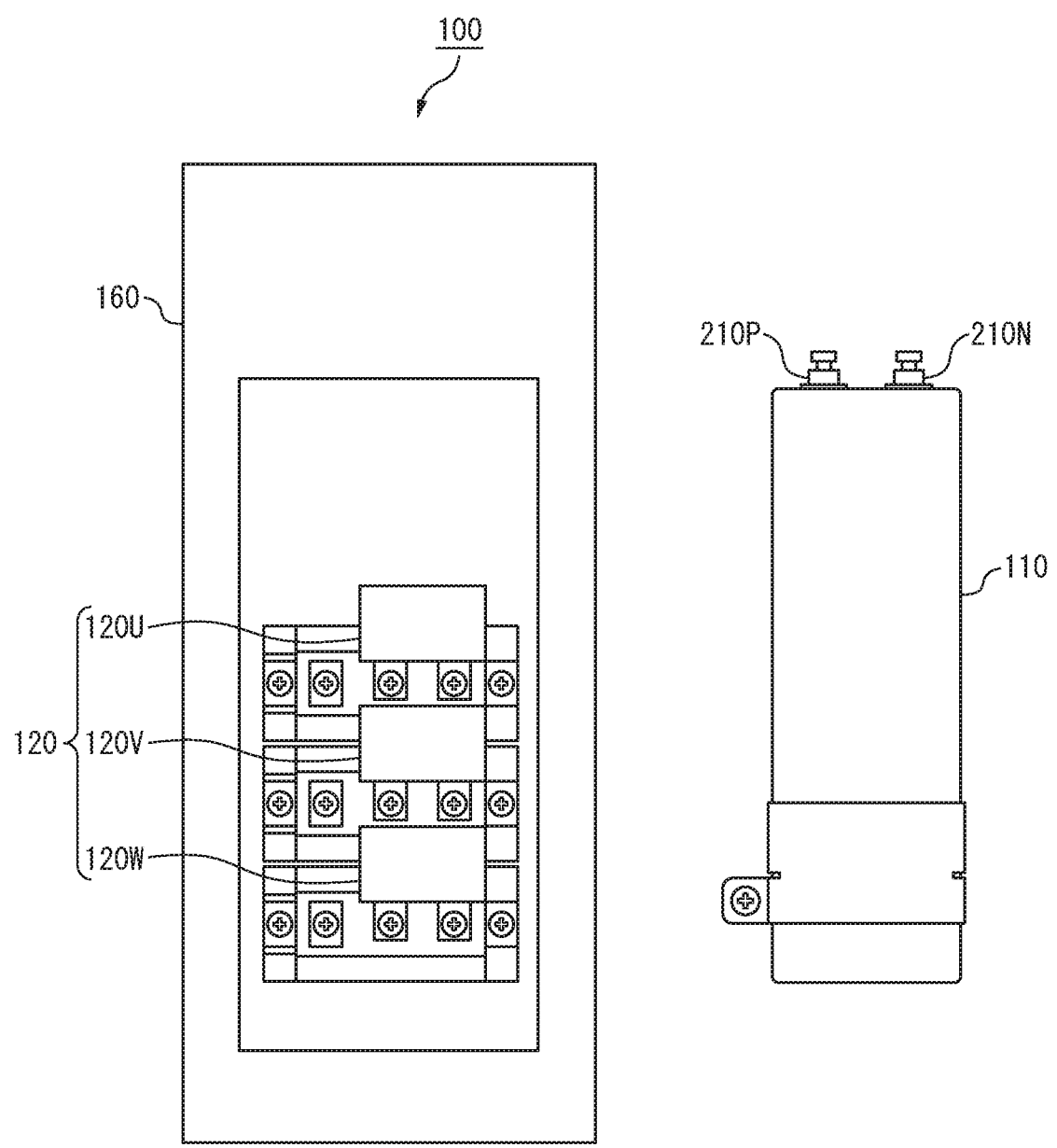
FIG. 7 is a view for explaining the positional relationship between a smoothing capacitor and a snubber capacitor in a conventional motor drive apparatus.
Figure 7:
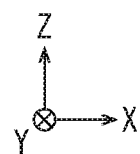

FIG. 7 is a view for explaining the positional relationship between a smoothing capacitor and a snubber capacitor in a conventional motor drive apparatus. In the example illustrated in FIG. 7, the −Z direction is assumed to be vertical. Again in the example illustrated in FIG. 7, for the sake of drawing simplicity, a smoothing capacitor 110 and a board 160 on which a snubber capacitor 120 is mounted are depicted as spaced apart from each other, but in practice, the smoothing capacitor 110 is superimposed on the board 160 in the +Y or −Y direction.

The smoothing capacitor 110 is often implemented as an electrolytic capacitor capable of ensuring a high capacitance at a small volume. Since the electrolytic capacitor may increase in its internal pressure as its internal electrolyte evaporates and turns into a gas upon excess voltage application, an opening for allowing the gas to escape is formed near a terminal. To prevent the electrolyte from leaking out of the opening, therefore, the electrolytic capacitor is subject to a constraint that it may be preferably placed so that the terminal does not face vertically. In the example illustrated in FIG. 7, the smoothing capacitor 110 is placed so that a positive electrode terminal 210P and a negative electrode terminal 210N face up along the Z-axis (in +Z direction). When the snubber capacitor 120 (snubber capacitors 120U, 120V, and 120W) may be preferably placed in the lower portion of the board 160 of a motor drive apparatus 100 on the Z-axis in terms of design, since the electrical path between the smoothing capacitor 110 and the snubber capacitor 120 is long, the magnitude of the inductance component is high. Due to the presence of the high inductance component, the potential difference between the smoothing capacitor 110 and the snubber capacitor 120 is large, and this results in a high ringing current and, in turn, results in high heat losses of the smoothing capacitor 110 and the snubber capacitor 120. Since, as described above, a screw terminal, large-sized electrolytic capacitor is subject to a particularly strict constraint in terms of placement position, the electrical path between the smoothing capacitor 110 and the snubber capacitor 120 is long, and the heat losses of the smoothing capacitor 110 and the snubber capacitor 120 are particularly high.

Figure 8:
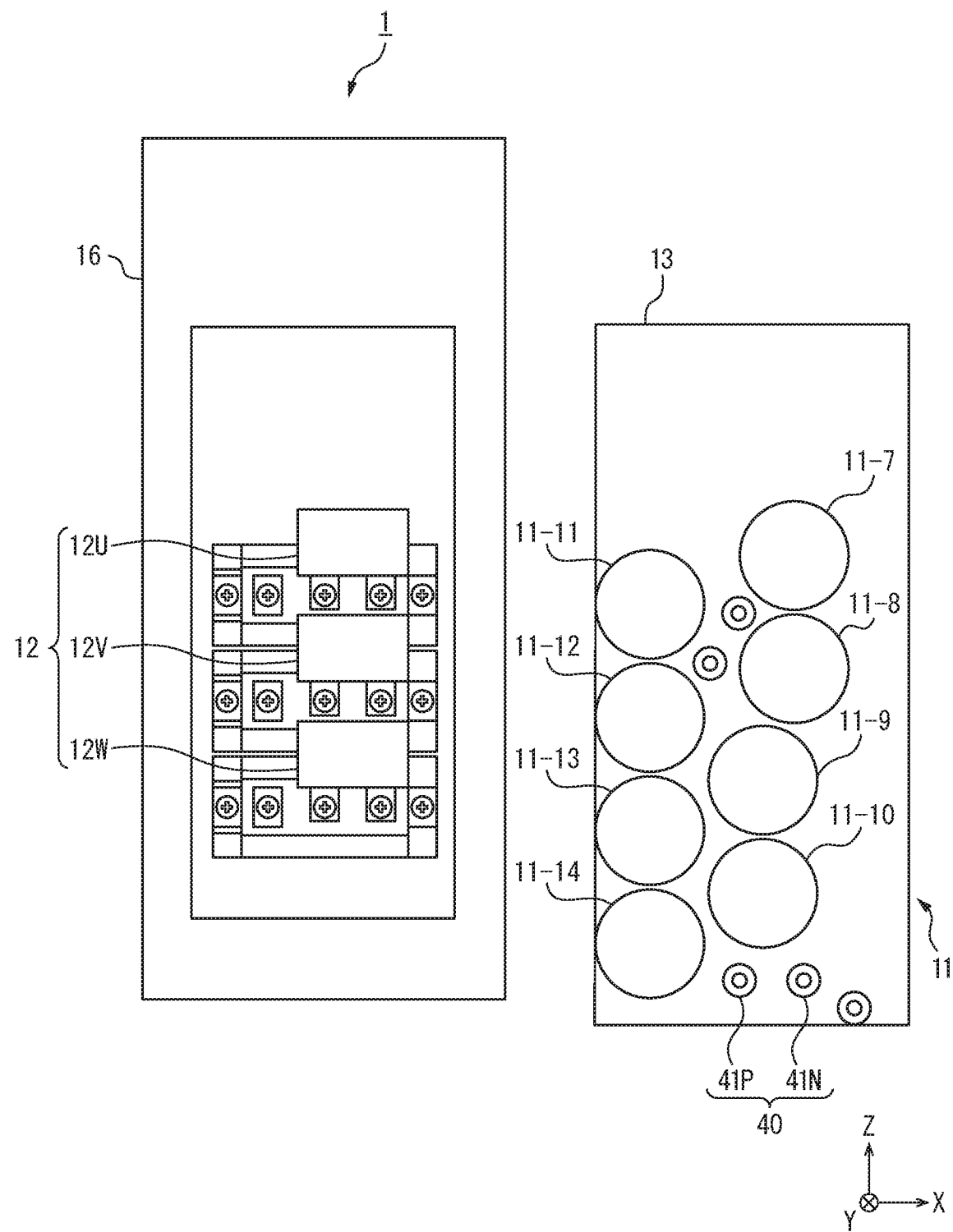
FIG. 8 is a view for explaining the positional relationship between the smoothing capacitor unit and the snubber capacitor in the motor drive apparatus according to the embodiment of the present disclosure.

FIG. 8 is a view for explaining the positional relationship between the smoothing capacitor unit and the snubber capacitor in the motor drive apparatus according to the embodiment of the present disclosure. In the example illustrated in FIG. 8, the −Z direction is assumed to be vertical. Again in the example illustrated in FIG. 8, for the sake of drawing simplicity, the smoothing capacitor unit 11 and the printed circuit board 16 on which the snubber capacitor 12 is mounted are depicted as spaced apart from each other, but in practice, the smoothing capacitor unit 11 is superimposed on the printed circuit board 16 in the +Y or −Y direction.

The case where the smoothing capacitor unit 11 according to the first mode illustrated in FIGS. 4A and 4B is provided in the motor drive apparatus 1 will be taken as an example herein. The smoothing capacitor unit 11 is formed by the smoothing capacitors 11-7 to 11-14 electrically connected to each other, and is mounted on the support plate 13.

The support plate 13 is provided with a connection portion 40 formed by a pair of a positive connection portion 41P and a negative connection portion 41N. When the snubber capacitor 12 (snubber capacitors 12U, 12V, and 12W) is placed, e.g., in the lower portion of the printed circuit board 16 of the motor drive apparatus 1 on the Z-axis, the connection portion 40 is provided in the lower portion of the support plate 13 on the Z-axis, as illustrated in FIG. 8. The positive connection portion 41P and the negative connection portion 41N are made of, e.g., conductive members such as lands extending through the two surfaces of the support plate 13. The positive electrode terminal 21P of the smoothing capacitor unit 11 is electrically connected to the positive connection portion 41P via a first electrical conductor (not illustrated in FIG. 8), and the negative electrode terminal 21N of the smoothing capacitor unit 11 is electrically connected to the negative connection portion 41N via a second electrical conductor (not illustrated in FIG. 8). The positive connection portion 41P on the support plate 13 is further electrically connected to the positive electrode terminal 22P of the snubber capacitor 12 via the first electrical conductor. The negative connection portion 41N on the support plate 13 is further electrically connected to the negative electrode terminal 22N of the snubber capacitor 12 via the second electrical conductor.

As another example, the positive connection portion 41P and the negative connection portion 41N may be provided as holes running through the support plate 13, and the first electrical conductor and the second electrical conductor may extend through the respective holes. In this case, the positive electrode terminal 21P of the smoothing capacitor unit 11 is electrically directly connected to the positive electrode terminal 22P of the snubber capacitor 12 via the first electrical conductor extending through the positive connection portion 41P implemented as the hole. The negative electrode terminal 21N of the smoothing capacitor unit 11 is electrically directly connected to the negative electrode terminal 22N of the snubber capacitor 12 via the second electrical conductor extending through the negative connection portion 41N implemented as the hole.

In this manner, since both the snubber capacitor 12 and the connection portion 40 are provided in the lower portions on the Z-axis, the electrode terminal 21 of the smoothing capacitor unit 11 and the electrode terminal 22 of the snubber capacitor 12 are placed in proximity to each other. Therefore, since the electrical path between the positive electrode terminal 21P of the smoothing capacitor unit 11 and the positive electrode terminal 22P of the electrode terminal 22 of the snubber capacitor 12, and the electrical path between the negative electrode terminal 21N of the smoothing capacitor unit 11 and the negative electrode terminal 22N of the electrode terminal 22 of the snubber capacitor 12 are short, the magnitude of the inductance component is low. This results in a low ringing current, and the heat losses of the smoothing capacitor unit 11 and the snubber capacitor 12 can thus be kept down. In this embodiment, furthermore, the low-capacitance smoothing capacitors 11-7 to 11-14 in the smoothing capacitor unit 11 can be arranged at relatively free positions, and accordingly exhibit a degree of freedom in design higher than that of the smoothing capacitor 110 implemented as a screw terminal, high-capacitance electrolytic capacitor as illustrated in FIG. 7.

The number of smoothing capacitors and their connection relationship in the smoothing capacitor unit 11 may be preferably determined as appropriate in accordance with, e.g., the magnitude of the DC link voltage and the withstand voltage of each smoothing capacitor. For example, the larger the number of smoothing capacitors connected in series with each other in the smoothing capacitor unit 11, the higher the DC link voltage that can be handled becomes.

Figure 9:
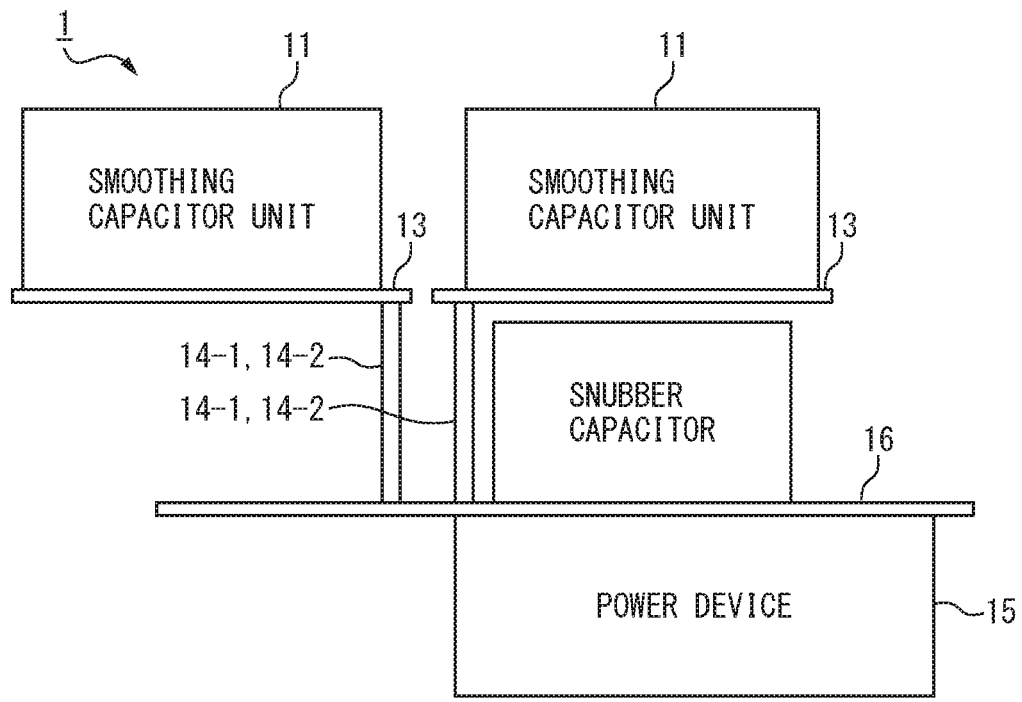
FIG. 9 is a side view schematically illustrating the mounting structure of a plurality of smoothing capacitor units connected in series with each other in the motor drive apparatus according to the embodiment of the present disclosure.

FIG. 9 is a side view schematically illustrating the mounting structure of a plurality of smoothing capacitor units connected in series with each other in the motor drive apparatus according to the embodiment of the present disclosure. Higher DC link voltages can be handled even by connecting a plurality of smoothing capacitor units 11 in series with each other. In this case, the support plate 13 is equipped with the plurality of smoothing capacitor units 11.

Figure 10:
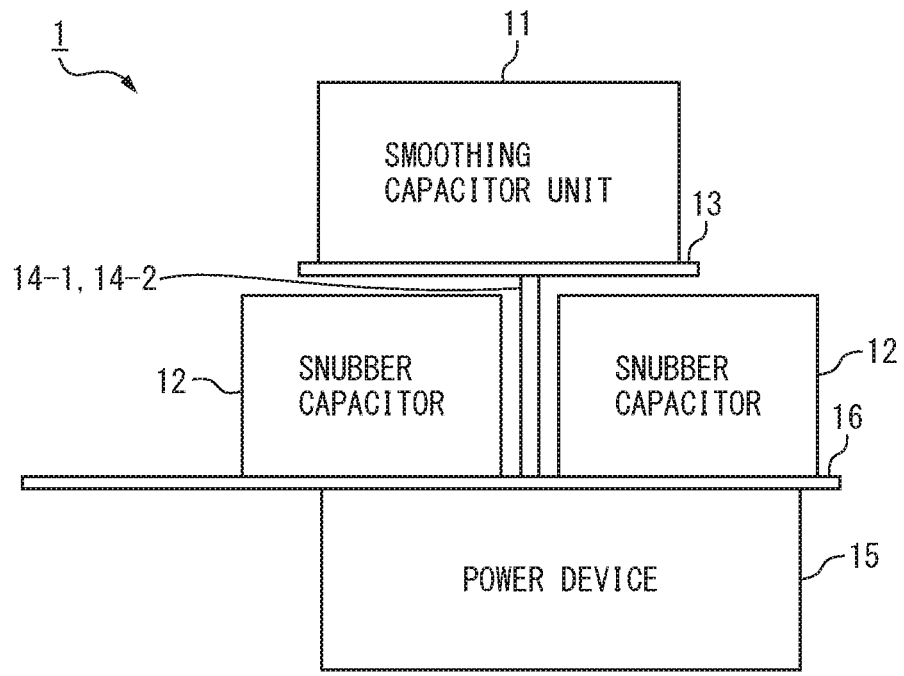
FIG. 10 is a side view schematically illustrating the mounting structure of a plurality of snubber capacitors connected in parallel with each other in the motor drive apparatus according to the embodiment of the present disclosure.

The snubber capacitor 12 is provided in correspondence with the power device 15 of each phase, but high-capacitance design may be attained by connecting snubber capacitors 12 in parallel with each other in this one phase. FIG. 10 is a side view schematically illustrating the mounting structure of a plurality of snubber capacitors connected in parallel with each other in the motor drive apparatus according to the embodiment of the present disclosure. Since the capacitance can be set high by connecting a plurality of snubber capacitors 12 in parallel with each other as appropriate, higher surge voltages can even be suppressed. In this case, the printed circuit board 16 is equipped with the plurality of snubber capacitors 12.

Several modes of the mounting structure of the first electrical conductor 14-1 and the second electrical conductor 14-2 for further suppressing a ringing current will be enumerated subsequently. A closed circuit (loop circuit) is formed between the positive electrode terminals and the negative electrode terminals of the smoothing capacitor unit 11 and the snubber capacitor 12, and thus generates more or less inductance component. In view of this, the magnitude of the inductance component 31 can be reduced by placing the first electrical conductor 14-1 for electrically connecting the positive electrode terminal 21P of the smoothing capacitor unit 11 and the positive electrode terminal 22P of the snubber capacitor 12 to each other, and the second electrical conductor 14-2 for electrically connecting the negative electrode terminal 21N of the smoothing capacitor unit 11 and the negative electrode terminal 22N of the snubber capacitor 12 to each other, so that the first electrical conductor 14-1 and the second electrical conductor 14-2 include portions in proximity to each other.

Figure 11A:
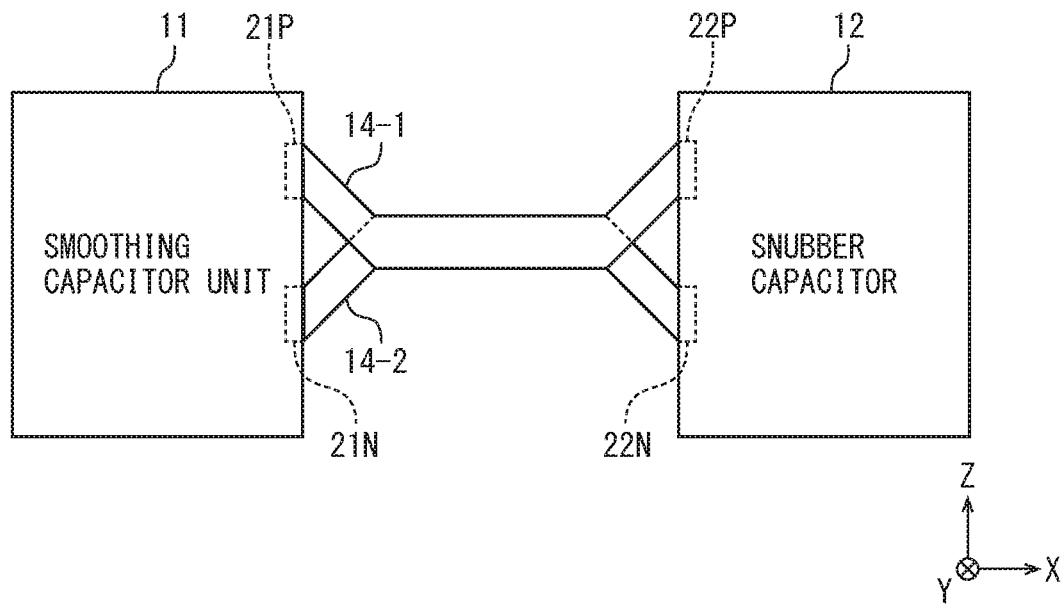
FIG. 11A is a top view illustrating an exemplary first mode of the mounting structure of a first electrical conductor and a second electrical conductor in the motor drive apparatus according to the embodiment of the present disclosure.
Figure 11B:
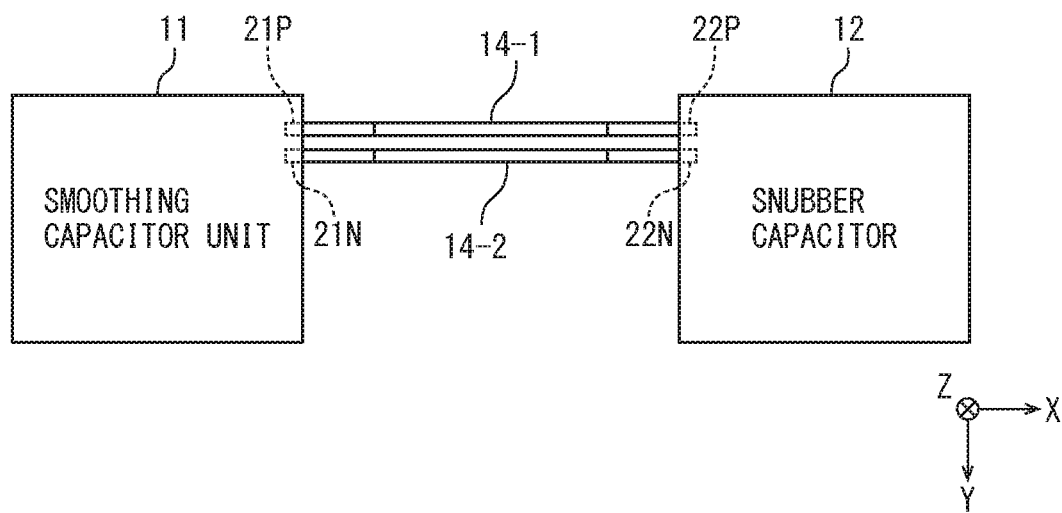
FIG. 11B is a side view illustrating the exemplary first mode of the mounting structure of the first electrical conductor and the second electrical conductor in the motor drive apparatus according to the embodiment of the present disclosure.

FIG. 11A is a top view illustrating an exemplary first mode of the mounting structure of a first electrical conductor and a second electrical conductor in the motor drive apparatus according to the embodiment of the present disclosure. FIG. 11B is a side view illustrating the exemplary first mode of the mounting structure of the first electrical conductor and the second electrical conductor in the motor drive apparatus according to the embodiment of the present disclosure. In the example illustrated in FIGS. 11A and 11B, for the sake of drawing simplicity, the support plate 13 is not depicted. According to the first mode illustrated in FIGS. 11A and 11B, the first electrical conductor 14-1 and the second electrical conductor 14-2 are overlaid on each other in the Y direction in the vicinities of their middle portions.

Figure 12A:
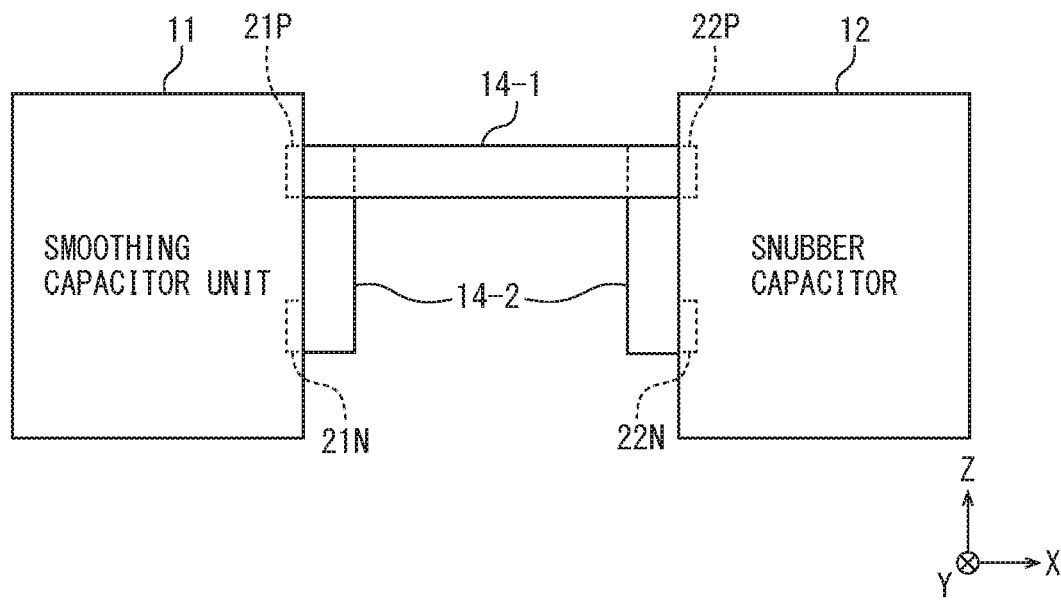
FIG. 12A is a top view illustrating an exemplary second mode of the mounting structure of a first electrical conductor and a second electrical conductor in the motor drive apparatus according to the embodiment of the present disclosure.
Figure 12B:
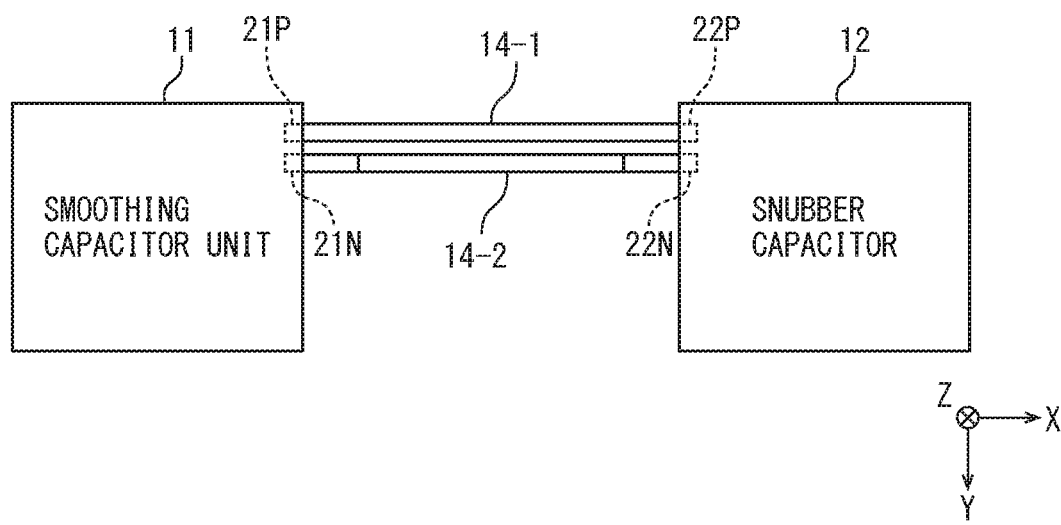
FIG. 12B is a side view illustrating the exemplary second mode of the mounting structure of the first electrical conductor and the second electrical conductor in the motor drive apparatus according to the embodiment of the present disclosure.

FIG. 12A is a top view illustrating an exemplary second mode of the mounting structure of a first electrical conductor and a second electrical conductor in the motor drive apparatus according to the embodiment of the present disclosure. FIG. 12B is a side view illustrating the exemplary second mode of the mounting structure of the first electrical conductor and the second electrical conductor in the motor drive apparatus according to the embodiment of the present disclosure. In the example illustrated in FIGS. 12A and 12B, for the sake of drawing simplicity, the support plate 13 is not depicted. According to the second mode illustrated in FIGS. 12A and 12B, as well as the first mode illustrated in FIGS. 11A and 11B, the first electrical conductor 14-1 and the second electrical conductor 14-2 are overlaid on each other in the Y direction in the vicinities of their middle portions. The second mode illustrated in FIGS. 12A and 12B, however, is different from the first mode illustrated in FIGS. 11A and 11B in terms of the arrangement of portions in the vicinities of the connection portions between the smoothing capacitor unit 11 and the snubber capacitor 12, and the first electrical conductor 14-1 and the second electrical conductor 14-2.

Figure 13A:
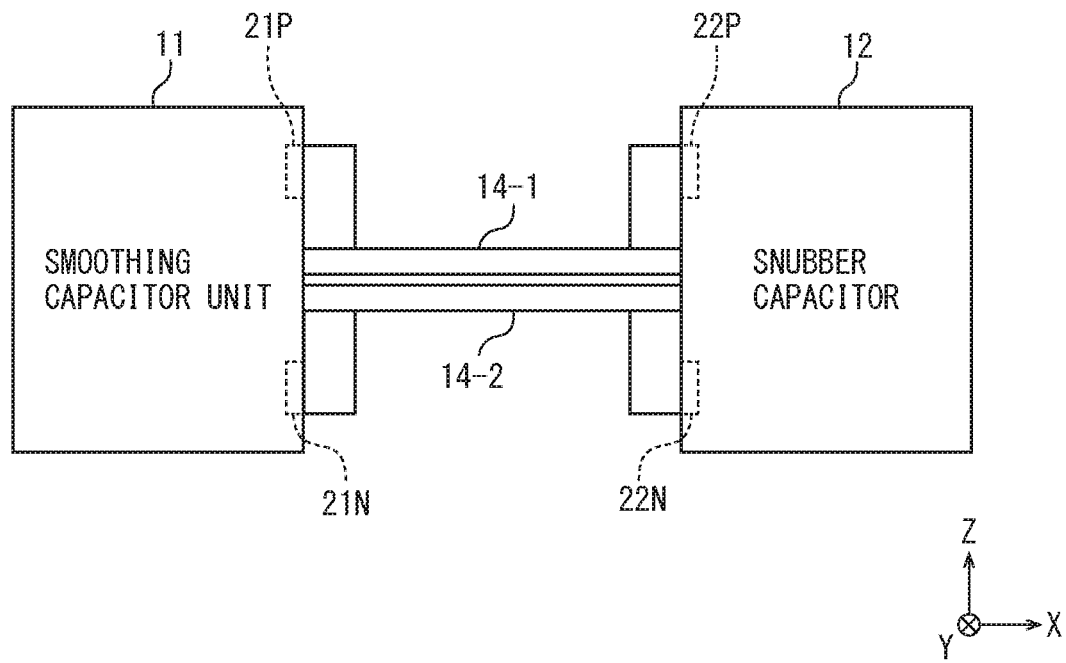
FIG. 13A is a top view illustrating an exemplary third mode of the mounting structure of a first electrical conductor and a second electrical conductor in the motor drive apparatus according to the embodiment of the present disclosure.
Figure 13B:
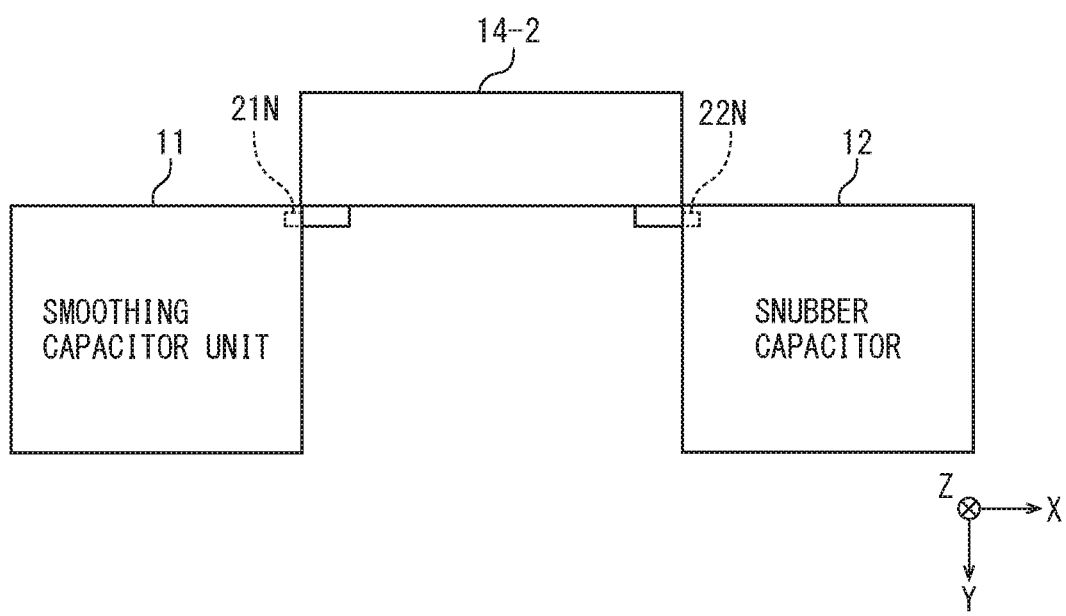
FIG. 13B is a side view illustrating the exemplary third mode of the mounting structure of the first electrical conductor and the second electrical conductor in the motor drive apparatus according to the embodiment of the present disclosure.

FIG. 13A is a top view illustrating an exemplary third mode of the mounting structure of a first electrical conductor and a second electrical conductor in the motor drive apparatus according to the embodiment of the present disclosure. FIG. 13B is a side view illustrating the exemplary third mode of the mounting structure of the first electrical conductor and the second electrical conductor in the motor drive apparatus according to the embodiment of the present disclosure. In the example illustrated in FIGS. 13A and 13B, for the sake of drawing simplicity, the support plate 13 is not depicted. According to the third mode illustrated in FIGS. 13A and 13B, the first electrical conductor 14-1 and the second electrical conductor 14-2 are overlaid on each other in the Z direction in the vicinities of their middle portions.

In all of the above-mentioned first to third modes, insulation may be preferably ensured between the first electrical conductor 14-1 and the second electrical conductor 14-2. For example, the first electrical conductor 14-1 and the second electrical conductor 14-2 may be spaced apart from each other within the range in which their insulation can be ensured, or one or both of the first electrical conductor 14-1 and the second electrical conductor 14-2 may be coated with insulating coatings.

A modification of the connection portion 40 mounted on the support plate 13 will be described subsequently.

FIG. 14 is a side view illustrating an exemplary modification of a connection portion in the motor drive apparatus according to the embodiment of the present disclosure. In the example illustrated in FIG. 14, the −Z direction is assumed to be vertical. Again in the example illustrated in FIG. 14, for the sake of drawing simplicity, the support plate 13 and the printed circuit board 16 (printed circuit boards 16A, 16B, and 16C) on which the snubber capacitor 12 is mounted are depicted as spaced apart from each other, but in practice, any of the printed circuit boards 16A, 16B, and 16C is overlaid on the support plate 13 in the +Y direction. The positions of the snubber capacitors 12 in the printed circuit boards 16A, 16B, and 16C illustrated in FIG. 14 are merely an example, and the snubber capacitor 12 may be mounted at a position on the printed circuit board 16 other than those illustrated in FIG. 14.

As long as a plurality of connection portions 40A, 40B, and 40C each including a positive connection portion 41P and a negative connection portion 41N are provided on the support plate 13 in advance to be shifted from each other along the Z direction, a connection portion that minimizes the electrical path between the electrode terminal 21 of the smoothing capacitor unit 11 and the electrode terminal 22 of the snubber capacitor 12 can be selected in accordance with the position of the snubber capacitor 12 in the Z direction on the printed circuit board 16. In the example illustrated in FIG. 14, the number of connection portions provided on the support plate 13 is set to three as an example, but two, or four or more connection portions may be used.

The positive electrode terminal 21P of the smoothing capacitor unit 11 and the positive electrode terminal 22P of the snubber capacitor 12 are electrically connected to each other by the first electrical conductor 14-1 routed through the positive connection portion 41P in one of the plurality of connection portions 40A, 40B, and 40C provided on the support plate 13, and the negative electrode terminal 21N of the smoothing capacitor unit 11 and the negative electrode terminal 22N of the snubber capacitor 12 are electrically connected to each other by the second electrical conductor 14-2 routed through the negative connection portion 41N in this connection portion.

When, for example, the printed circuit board 16A having the snubber capacitor 12 mounted on its upper portion in the Z direction is overlaid on the support plate 13 in the +Y direction, the connection portion 40A is selected. In this case, the positive electrode terminal 21P of the smoothing capacitor unit 11 is electrically connected to the positive connection portion 41P of the connection portion 40A via the first electrical conductor 14-1 (not illustrated in FIG. 14), and the negative electrode terminal 21N of the smoothing capacitor unit 11 is electrically connected to the negative connection portion 41N of the connection portion 40A via the second electrical conductor 14-2 (not illustrated in FIG. 14). The positive connection portion 41P of the connection portion 40A on the support plate 13 is further electrically connected to the positive electrode terminal 22P of the snubber capacitor 12 on the printed circuit board 16A via the first electrical conductor 14-1. The negative connection portion 41N of the connection portion 40A on the support plate 13 is further electrically connected to the negative electrode terminal 22N of the snubber capacitor 12 on the printed circuit board 16A via the second electrical conductor 14-2.

When, for example, the printed circuit board 16B having the snubber capacitor 12 mounted on its middle portion in the Z direction is overlaid on the support plate 13 in the +Y direction, the connection portion 40B is selected. In this case, the positive electrode terminal 21P of the smoothing capacitor unit 11 is electrically connected to the positive connection portion 41P of the connection portion 40B via the first electrical conductor 14-1 (not illustrated in FIG. 14), and the negative electrode terminal 21N of the smoothing capacitor unit 11 is electrically connected to the negative connection portion 41N of the connection portion 40B via the second electrical conductor 14-2 (not illustrated in FIG. 14). The positive connection portion 41P of the connection portion 40B on the support plate 13 is further electrically connected to the positive electrode terminal 22P of the snubber capacitor 12 on the printed circuit board 16B via the first electrical conductor 14-1. The negative connection portion 41N of the connection portion 40B on the support plate 13 is further electrically connected to the negative electrode terminal 22N of the snubber capacitor 12 on the printed circuit board 16B via the second electrical conductor 14-2.

When, for example, the printed circuit board 16C having the snubber capacitor 12 mounted on its lower portion in the Z direction is overlaid on the support plate 13 in the +Y direction, the connection portion 40C is selected. In this case, the positive electrode terminal 21P of the smoothing capacitor unit 11 is electrically connected to the positive connection portion 41P of the connection portion 40C via the first electrical conductor 14-1 (not illustrated in FIG. 14), and the negative electrode terminal 21N of the smoothing capacitor unit 11 is electrically connected to the negative connection portion 41N of the connection portion 40C via the second electrical conductor 14-2 (not illustrated in FIG. 14). The positive connection portion 41P of the connection portion 40C on the support plate 13 is further electrically connected to the positive electrode terminal 22P of the snubber capacitor 12 on the printed circuit board 16C via the first electrical conductor 14-1. The negative connection portion 41N of the connection portion 40C on the support plate 13 is further electrically connected to the negative electrode terminal 22N of the snubber capacitor 12 on the printed circuit board 16C via the second electrical conductor 14-2.

In this manner, the electrode terminal 21 of the smoothing capacitor unit 11 and the electrode terminal 22 of the snubber capacitor 12 are placed in proximity to each other via one of the plurality of connection portions 40A, 40B, and 40C. With this arrangement, a connection portion on the support plate 13 that keeps a low inductance component in the electrical path between the positive electrode terminal 21P of the smoothing capacitor unit 11 and the positive electrode terminal 22P of the electrode terminal 22 of the snubber capacitor 12, and the electrical path between the negative electrode terminal 21N of the smoothing capacitor unit 11 and the negative electrode terminal 22N of the electrode terminal 22 of the snubber capacitor 12 (i.e., one that can more effectively keep down the heat losses of the smoothing capacitor unit 11 and the snubber capacitor 12) can be selected from the plurality of connection portions 40A, 40B, and 40C. Therefore, as long as a plurality of connection portions (in the example illustrated in FIG. 14, the connection portions 40A, 40B, and 40C) are provided on the support plate 13 in advance, since design handling can be done by only one type of support plate 13 regardless of the position of the snubber capacitor 12 on the printed circuit board 16, the types of inventory items of the support plate 13 equipped with the smoothing capacitor unit 11 can be reduced. As a result, cost saving and structure simplification of the motor drive apparatus 1 can be achieved.

According to one aspect of the present disclosure, a simply structured, compact, low-cost motor drive apparatus that can reduce the heat losses of a smoothing capacitor and a snubber capacitor can be achieved.

The invention claimed is:

1. A motor drive apparatus comprising:
a smoothing capacitor unit including at least one smoothing capacitor configured to smooth a voltage between a converter circuit that converts alternating-current power supplied to the motor drive apparatus from an alternating-current supply into direct-current power supply and an inverter circuit that converts the direct-current power supply into alternating-current power supply in a power conversion circuit that generates motor drive power, wherein the generated motor drive power is based on the converted direct-current power supply from the converter circuit of the motor drive apparatus; and
a snubber capacitor for suppressing a surge voltage of a power device forming a part of the power conversion circuit, a separate snubber capacitor is provided for each power device,
wherein an electrode terminal of the smoothing capacitor unit and an electrode terminal of the snubber capacitor are placed in proximity to each other, and
a positive electrode terminal of the electrode terminal of the smoothing capacitor unit and a positive electrode terminal of the electrode terminal of the snubber capacitor are electrically connected to each other, and a negative electrode terminal of the electrode terminal of the smoothing capacitor unit and a negative electrode terminal of the electrode terminal of the snubber capacitor are electrically connected to each other.

2. The motor drive apparatus according to claim 1, wherein the electrode terminal of the smoothing capacitor unit and the electrode terminal of the snubber capacitor face each other.

3. The motor drive apparatus according to claim 2, further comprising a support plate on which the smoothing capacitor unit is mounted,
wherein the electrode terminal of the smoothing capacitor unit and the electrode terminal of the snubber capacitor are placed on opposite sides of the support plate.

4. The motor drive apparatus according to claim 1, further comprising:
a first electrical conductor for electrically connecting the positive electrode terminal of the smoothing capacitor unit and the positive electrode terminal of the snubber capacitor to each other; and
a second electrical conductor for electrically connecting the negative electrode terminal of the smoothing capacitor unit and the negative electrode terminal of the snubber capacitor to each other,
wherein the first electrical conductor and the second electrical conductor include portions in proximity to each other.

5. The motor drive apparatus according to claim 4, wherein the support plate is provided with a plurality of connection portions each including a pair of a positive connection portion and a negative connection portion, and
the positive electrode terminal of the smoothing capacitor unit and the positive electrode terminal of the snubber capacitor are electrically connected to each other by the first electrical conductor routed through the positive connection portion in one connection portion of the plurality of connection portions, and the negative electrode terminal of the smoothing capacitor unit and the negative electrode terminal of the snubber capacitor are electrically connected to each other by the second electrical conductor routed through the negative connection portion in the one connection portion.

6. The motor drive apparatus according to claim 4, wherein the positive electrode terminal and the negative electrode terminal of the smoothing capacitor unit, and the positive electrode terminal and the negative electrode terminal of the snubber capacitor comprise screw terminals.

7. The motor drive apparatus according to claim 4, wherein the positive electrode terminal of the smoothing capacitor unit and the positive electrode terminal of the snubber capacitor are electrically connected to the first electrical conductor by soldering, and
the negative electrode terminal of the smoothing capacitor unit and the negative electrode terminal of the snubber capacitor are electrically connected to the second electrical conductor by soldering.

8. The motor drive apparatus according to claim 1, wherein a plurality of smoothing capacitor units are electrically connected in series with each other.

9. The motor drive apparatus according to claim 1, wherein the snubber capacitor comprises a plurality of snubber capacitors electrically connected in parallel with each other.

* * * * *